Dec. 29, 1959  T. E. FRAME ET AL  2,919,379
CATHODE RAY TUBE DEFLECTION CIRCUIT
Filed Oct. 31, 1958  2 Sheets-Sheet 1

INVENTORS
T. E. FRAME
G. R. VAUGHAN
BY
ATTORNEY
AGENT ary winding 6 in proportion to the sine of $\theta$. In this

United States Patent Office 2,919,379
Patented Dec. 29, 1959

2,919,379

CATHODE RAY TUBE DEFLECTION CIRCUIT

Thomas E. Frame, Glen Burnie, and George R. Vaughan, Linthicum Heights, Md., assignors, by mesne assignments, to the United States of America as represented by the Secretary of the Air Force Application October 31, 1958, Serial No. 771,170

4 Claims. (Cl. 315—26)

This invention relates to cathode ray tube deflection circuits in which the deflection of the beam is magnetically produced, and has as its primary object the provision of means for insuring that the sweep of the beam always starts at a predetermined point on the screen of the tube. The invention is particularly concerned with cathode ray tube indicators of the PPI (plan position indicator) type as used in radar systems in which the deflection coils of the tube are directly driven from the output windings of a sine-cosine resolver, which in turn is mechanically driven in step with the rotation of the transmitting antenna. The resolver is electrically driven with a waveform designed to produce a linear sawtooth of current in the deflection coils of the tube the instantaneous magnitudes of which are the rectangular coordinates of the instantaneous beam positions. It is desired that the sweep always start at the center of the cathode ray tube screen which is the beam position when the currents in both deflection coils are zero. However, if the resolver is driven with a waveform designed to give simply the desired sawtooth of current in the deflection coils, a difficulty arises due to the inability of the resolver, which is a transformer, to transmit a direct current component from the driving wave to the deflection coil circuits. The sawtooth waveforms of the deflection currents are therefore required to balance themselves relative to a zero current axis so that the net transfer of charge per cycle is zero. The start of the sweep portion of the wave therefore no longer corresponds to the zero current condition and the sweep starting point is displaced from the center of the screen as a result. To overcome this difficulty it has been proposed to add a balancing area to the resolver driving waveform of such size as, when transferred to the deflection coil circuits, to exactly balance the area under the sweep portion of the current wave. This operates to position the entire sweep portion of the deflection current wave on one side of the zero current axis with the result that the sawtooth of current starts at zero current and therefore with beam at the center of the cathode ray tube screen. It is the specific object of the invention to provide means for adding a balancing area to the driving waveform of the resolver to achieve the above result.

Figure 1:
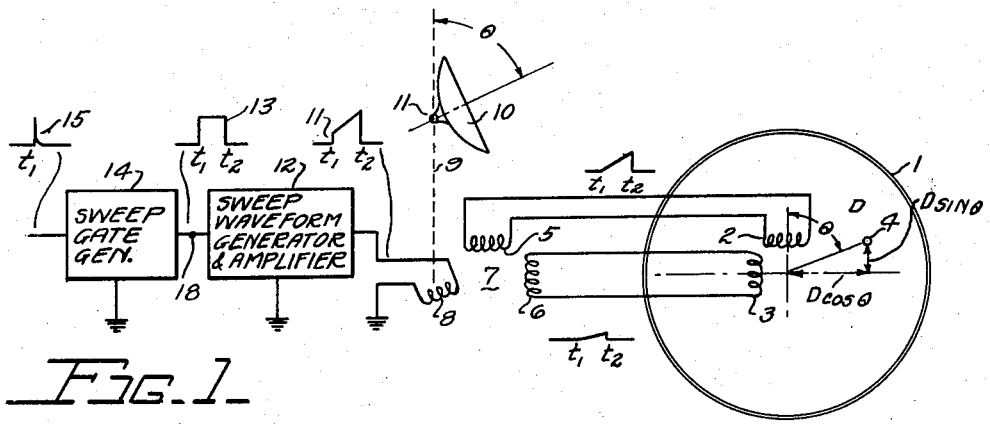
Figure 2:
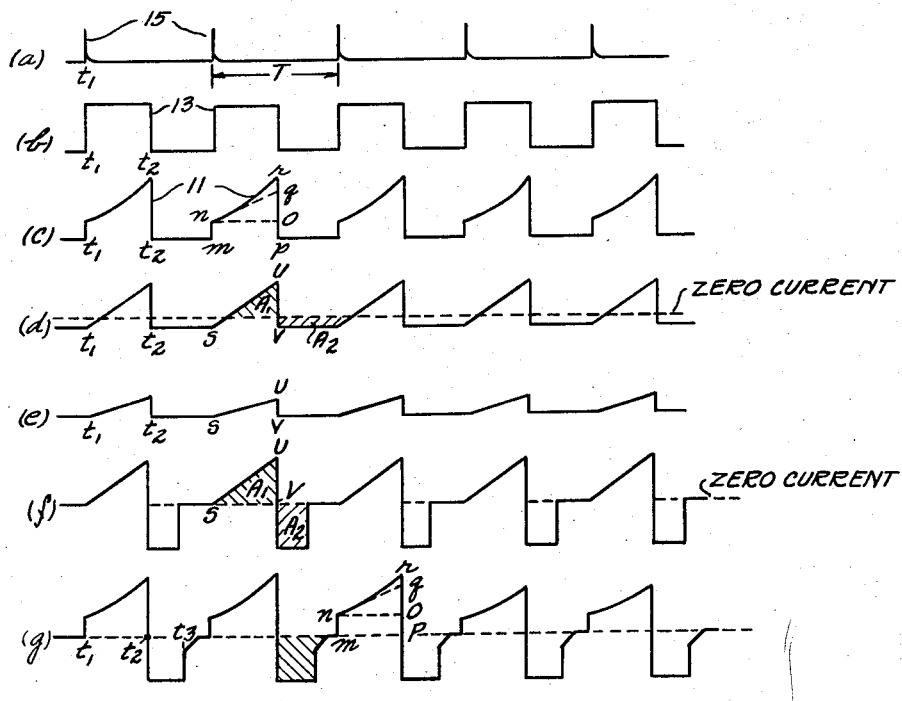
Figure 3:
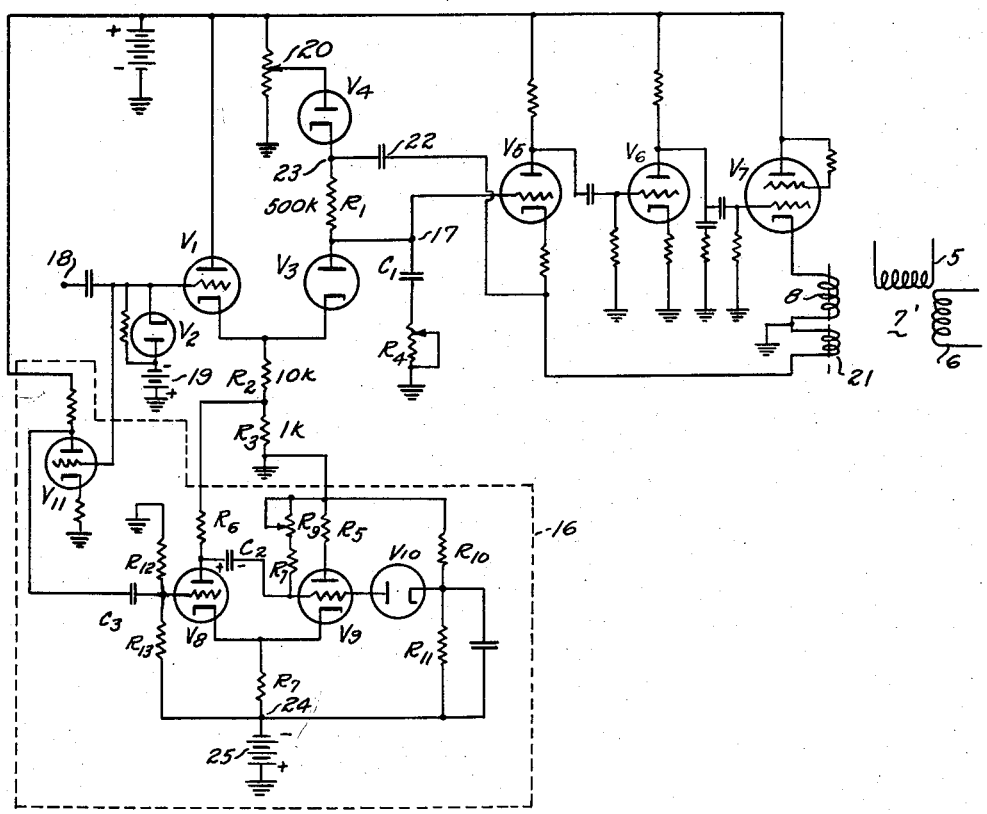

A more detailed description of the invention will be given with reference to the accompanying drawings in which Fig. 1 shows the general arrangement for a cathode ray tube indicator having resolver driven deflection circuits, Fig. 2 shows waveforms occurring in the deflection system, and Fig. 3 is a schematic diagram of the invention as applied to a known type of sweep waveform generator.

Referring to Fig. 1, 1 represents the screen of a cathode ray tube used as a PPI. The beam is deflected by means of two coils 2 and 3 positioned at right angles and operating to deflect the beam from the center of the screen in the directions of mutually perpendicular axes by amounts proportional to the currents in the two coils. With zero current in both coils the beam is at the center of the screen. In the drawing the end 4 of the beam is shown as having an instantaneous position at a radial distance D from the screen center determined by the deflection $D \cos \theta$ provided by coil 2 and $D \sin \theta$ provided by coil 3.

Coils 2 and 3 are driven directly from stator windings 5 and 6 of a resolver 7 having a rotor winding 8. By means of a suitable coupling 9 the rotor winding is driven in step with transmitting antenna 10 which rotates at constant speed about point 11. The angular position of the antenna is represented by the angle $\theta$ measured from a predetermined reference direction. The resolver is, in effect, a rotary transformer so designed that the current in primary winding 8 induces a voltage in secondary winding 5 in proportion to the cosine of $\theta$ and in secondary winding 6 in proportion to the sine of $\theta$. In this manner the direction of the sweep outward from the center of screen 1 is made to always correspond to the direction of the antenna.

For each sweep a current having the waveform 11 (also shown at (b) in Fig. 2 produced by sweep gate flow through rotor or primary winding 8 by sweep waveform generator and amplifier 12. This waveform is generated during the interval defined by sweep gate 13 (also shown at (b) in Fig. 2) produced by sweep gate generator 14 and initiated by synchronizing pulse 15 (also shown at (a) in Fig. 2) derived from the radar transmitter.

Referring now to Fig. 2 and reviewing somewhat, the synchronizing pulses 15 at (a) of repetition interval T, derived from the transmitter and coincident with the short pulses of high frequency energy radiated by antenna 10, are applied to sweep gate generator 14 which is triggered by each to produce gates 13 shown at (b). This generator may be of any suitable known type such as a monostable multivibrator. Considering $t_1$ to be the start of a sweep cycle, the gate extends from $t_1$ to $t_2$ and the interval defined thereby controls the sweep duration. This gate is applied to sweep waveform generator and amplifier 12 and causes this generator to produce the waveform of current 11, shown at (c), through winding 8 during the interval extending from $t_1$ to $t_2$. As known in the art and described in the literature, for example, vol. 22, Cathode Ray Tube Displays, chapter 10, of the Radiation Laboratory Series, McGraw-Hill, the waveform of the current in coil 8 required to produce a linear sawtooth of current in each of deflection coils 2 and 3 should contain a constant or step component $mnop$, a sawtooth or $kt$ component $nqo$ and a $kt^2$ component $nrq$, $k$ being a constant and $t$ being time. With a driving current of this waveform the currents in deflection coils 2 and 3 have a sawtooth form as shown at (d) and (e), respectively. The sweep is produced by the $su$ portion, starting at $s$ and ending at $u$. During the $uv$ position the beam returns to the start point. For simplicity, the waves at (d) and (e) are illustrated for a fixed value of $\theta$, all cycles being shown alike. With $\theta$ varying at a constant rate the slopes of the sawtooth waves would change progressively from cycle to cycle in accordance with the sinecosine functions.

The difficulty with the foregoing system is that the sweep does not start at the center of the screen. The reason for this is illustrated at (d) in Fig. 2. Since the resolver 7 cannot pass a direct current component the sawtooth current wave in coil 2 must adjust itself to a condition of balance about the zero current axis in order that the net charge transfer in each cycle be zero. Therefore, as seen at (d), the current wave must have such relation to the zero current axis that areas $A_1$ and $A_2$ are equal. A similar situation exists for the current (e)

in coil 3. Under this condition it is evident that the starting point $s$ of the sweep does not occur at a condition of zero current and therefore does not occur with the beam at the center of the screen.

To correct the above condition it has been proposed to add an additional portion to each cycle of the sawtooth waves in coils 2 and 3 that has an area exactly equal to the area $suv$. This is illustrated at $(f)$ in Fig. 2 in which the area $A_2$ of the added portion is made exactly equal to the area $A_1$ under the sweep sawtooth. This has the effect of causing the zero current reference to pass through points $s$ and $v$ so that the sweep starts with zero current in coils 2 and 3 and the beam at the center of the screen. It has also been proposed to achieve the above balanced condition of the currents in the deflection coils by adding a balancing area to the waveform of the resolver driving current. Apparatus in accordance with the invention for effecting this addition to the driving wave is shown in Fig. 3.

Referring to Fig. 3, the circuit outside the boundary 16 is a suitable known embodiment of the sweep waveform generator and amplifier 12 of Fig. 1. This circuit is a composite of the circuits shown in Figs. 10–19 and 10–20 of the above mentioned vol. 22 of the Radiation Laboratory Series. The circuit operates to produce a voltage of waveform 11 (Fig. 2(c)) at point 17 and, by the use of a negative feedback amplifier, to force the current through rotor winding 8 of the resolver 7' to follow this waveform. The process is as follows:

The sweep gate 13 (Fig. 2(b)) is applied to terminal 18 as in Fig. 1. Prior to the application of the positive gate to terminal 18 at $t_1$, $V_1$ is cut off by virtue of the negative bias applied to its grid by voltage source 19. Clamping diode $V_2$ insures that the gate at the grid of $V_1$ always starts at the same negative potential. Also, at this time point 17 is substantially at ground potential due to the high value of $R_1$ relative to $R_2$ and $R_3$ and the small drop across $V_3$. At $t_1$, $V_1$ becomes conductive and remains conductive until $t_2$ due to the positive gate on its grid. Initiation of conduction in $V_1$ immediately raises the cathode potential of $V_3$ sufficiently to prevent conduction in $V_3$ for the duration of the gate. This permits point 17 to immediately rise to a potential determined by $R_4$ and the charging current of $C_1$. This potential is designated $n$ at $(g)$ in Fig. 2 and constitutes the step portion of the desired waveform. Condenser $C_1$ now begins to charge under the influence of the voltage at tap 20 acting through diode $V_4$ and $R_1$. The rising potential of point 17 is amplified in $V_5$ and $V_6$ and applied to the grid of cathode follower $V_7$ which controls the current in rotor winding 8. The rotor of resolver 7' differs from that of resolver 7 of Fig. 1 in that a feedback coil 21 coupled to coil 8 is added. The current in coil 8 induces a feedback voltage in coil 21 which is applied to the cathode of $V_5$ as a negative feedback causing the current in coil 8 to follow the waveform at point 17.

The feedback is also applied through blocking condenser 22 to point 23 where it plays a part in generating the desired voltage waveform at point 17. The feedback, being negative, causes the potential of the cathode of $V_5$ to follow the potential of the grid and the potential of point 23 to follow the potential of point 17. Therefore, as $C_1$ charges and the potential of point 17 rises, the feedback causes the potential of point 23 to rise also. If the amount of feedback is such that point 23 rises at the same rate as point 17 the potential difference between these points remains constant and $C_1$ charges at a constant rate. Under this condition, the potential of point 17 would rise linearly with time and the portion $nqo$ (Fig. 2) of the waveform would be generated. However, in order to generate the portion $nrq$, also, the feedback is increased slightly above the amount required for a constant charging rate so that the potential of point 23 increases at a slightly greater rate than that of point 17. As a result, the rate of charge transfer into $C_1$ increases slightly with time and the voltage of point 17 rises at a rate that increases with time to produce the $nqo$ and $nrq$ portions of the desired voltage waveform.

The sweep gate on the grid of $V_1$ ends at $t_2$. Therefore, at $t_2$, $V_1$ becomes nonconductive which restores conduction in $V_3$ and immediately drops the potential of point 17 to its initial quiescent value which is near ground or zero potential. Although $C_1$ now begins to discharge through $V_3$, $R_2$, $R_3$ and $R_4$, the value of $R_4$ is much greater than $R_2+R_3$ so that this discharge has little influence on the potential of point 17. Actually some slight rounding would occur at point $p$ as $C_1$ discharges to its quiescent state of substantially zero charge. The circuit so far described, i.e., without circuit 16, would remain in this quiescent state until the next sweep gate is applied to $V_1$. The current waveform in coil 8 would therefore be of the type illustrated at $(c)$ in Fig. 2 and the waveforms of the current in deflection coils 2 and 3 would be as shown at $(d)$ and $(e)$ in this figure.

The purpose of circuit 16 is to add a balancing area to the current waveform in coil 8 so that balanced deflection currents, of the general type shown at $(f)$ in Fig. 2, will be produced in the deflection coils. This circuit, which may be termed the area multivibrator, comprises a monostable multivibrator of the cathode coupled type with the grid of one tube returned to a point of high potential. The multivibrator is operated below ground potential, i.e. the high potential point for the circuit is ground and the low potential point is the negative terminal 24 of direct current source 25. Tube $V_9$ has its anode connected through load resistor $R_5$ to ground while the anode of $V_8$ is connected through load resistor $R_6$ to the junction of $R_2$ and $R_3$. The grid of $V_9$ is connected to ground, the high potential point, through $R_8$ and $R_9$. The maximum potential of this grid is limited, by diode $V_{10}$ and potential divider $R_{10}$ and $R_{11}$, to a potential below cathode potential but sufficiently high to produce full conduction in $V_9$. A regenerative loop exists in the circuit by virtue of the coupling between the output of $V_8$ and the input $V_9$ produced by $C_2$ and the coupling between the output of $V_9$ and the input of $V_8$ produced by common cathode resistor $R_7$. The operation of multivibrator circuits of this type is well understood. The circuit has a stable state in which $V_9$ is conductive and $V_8$ is nonconductive. The application of a positive pulse to the grid of $V_8$ sufficient to initiate conduction in this tube causes, through the regenerative action of this circuit, an immediate switch to the unstable state of the circuit in which $V_8$ is conductive and $V_9$ nonconductive. $C_2$, which had previously charged with the polarity shown, now begins to discharge through $R_8$ and $R_9$. As the discharge current decreases the potential of the grid of $V_9$ rises exponentially toward the cut-off point. When this point is reached, after a period determined by the discharge time constant of $C_2$ which is under the control of variable resistor $R_9$, conduction is initiated in $V_9$ and the circuit through its regenerative action immediately returns to its initial stable state with $V_9$ fully conductive and $V_8$ nonconductive.

During the interval $t_1$ to $t_2$, when the waveform $mnrp$ for producing the sawtooth of current in the deflection coils is being generated, circuit 16 is in its stable state and has no influence on the waveform generating circuit. At $t_2$ circuit 16 is triggered to its unstable state. This is accomplished through inverting the sweep gate by stage $V_{11}$, differentiating the inverted gate and applying the differentiated wave to the grid of $V_8$, the differentiation being accomplished by $C_3$ and $R_{12}$ and $R_{13}$ which are in parallel to the signal. Since the trailing edge of the inverted gate is positive-going, this results in a positive spike on the grid of $V_8$ at $t_2$.

At $t_2$, therefore, $V_8$ becomes fully conductive and, since its total anode current flows through $R_3$, the potential of the junction of $R_2$ and $R_3$ falls immediately to a potential below ground carrying point 17 with it at substantially the same potential. Point 17 assumes substantially the same potential as the junction because of the low impedance of $V_3$ when conductive and the comparatively low value of $R_2$ relative to $R_1$. The potential of point 17 remains below ground until the time, $t_3$, at which the multivibrator switches back to its stable state. At $t_3$, therefore, $V_8$ becomes nonconductive and the junction of $R_2$ and $R_3$ returns immediately to ground potential. This raises the cathode of $V_3$ cutting off conduction in this diode. Since, during the interval $t_2$ to $t_3$ when point 17 was negative, the charge in $C_2$ was reduced below the quiescent value of substantially zero and therefore reversed its polarity, this condenser now begins to charge in the positive direction through $R_1$, the point 17, at $t_3$, moving immediately upward in potential by an amount determined by the initial charging current and the value of $R_4$. Beyond $t_3$, the potential of point 17 rises as $C_1$ charges until the anode of $V_3$ reaches cathode potential at which time point 17 is clamped by $V_3$ at a potential slightly above ground where it remains until the next gate pulse on the grid of $V_1$.

The waveform generated at point 17, and therefore the waveform of the current in winding 8, is shown at (g) in Fig. 2. The size of the shaded area introduced by the circuit 16 is determined by the magnitude of the $V_8$ anode current, which in turn is determined by the voltage of source 25 and the bias produced by potentiometer $R_{12}$, $R_{13}$, and by the setting of $R_9$, the former determining the height of the area and the latter its width. The fine adjustment provided by $R_9$ permits this area to be sized so that in the current wave produced in the deflection coils the added area exactly balances the area under the sweep sawtooth, as illustrated in principle at (f) in Fig. 2, with the result that the sawtooth starts at zero current as desired.

We claim:

1. A beam deflection circuit for use with a cathode ray tube having a pair of beam deflecting windings comprising: a resolver having a primary winding and a pair of secondary windings directly coupled to the deflecting windings of said cathode ray tube; a capacitor and a first resistor connected between a terminal point and a point of reference potential; a first diode having its anode connected to said terminal point and its cathode connected through a second resistor to said point of reference potential; a second diode having its cathode connected to said terminal point through a resistor of high value relative to said second resistor and its anode connected to a fixed source of positive potential relative to said reference potential; an amplifier having its input circuit connected between said terminal point and said point of reference potential and having said resolver primary winding in its output circuit; means for producing a feedback voltage proportional to the current in said resolver primary winding and means for applying said feedback voltage negatively to the input of said amplifier; means for applying said feedback voltage also to the cathode of said second diode in such direction as to cause the potential of said cathode to vary in the same direction as the potential of said terminal point; a pair of amplifier tubes connected in a multivibrator circuit having stable and unstable states in each of which one tube is conductive and the other is nonconductive; means including at least a portion of said second resistor in the anode current circuit of the tube that is conductive in the unstable state of said multivibrator circuit, with the current flow in said resistor portion in the direction to reduce the cathode potential of said first diode; means operative for a predetermined interval for raising the potential of the cathode of said first diode sufficiently to prevent conduction in said diode; and means operative at the end of said interval for triggering said multivibrator to its unstable state.

2. A beam deflection circuit for use with a cathode ray tube having a pair of beam deflecting windings comprising: a resolver having a primary winding and a pair of secondary windings directly coupled to the deflecting windings of said cathode ray tube; a capacitor and a first resistor connected between a terminal point and a point of reference potential; a first diode having its anode connected to said terminal point and its cathode connected through a second resistor to said point of reference potential; a second diode having its cathode connected to said terminal point through a resistor of high value relative to said second resistor and its anode connected to a fixed source of positive potential relative to said reference potential; an amplifier having its input circuit connected between said terminal point and said point of reference potential and having said resolver primary winding in its output circuit; means for producing a feedback voltage proportional to the current in said resolver primary winding and means for applying said feedback voltage negatively to the input of said amplifier; means for applying said feedback voltage also to the cathode of said second diode in such direction as to cause the potential of said cathode to vary in the same direction as the potential of said terminal point; a pair of amplifier tubes connected in a multivibrator circuit having stable and unstable states in each of which one tube is conductive and the other is nonconductive; means including at least a portion of said second resistor in the anode current circuit of the tube that is conductive in the unstable state of said multivibrator circuit, with the current flow in said resistor portion in the direction to reduce the cathode potential of said first diode; a third tube having an anode connected to a point of positive potential, a cathode connected directly to the cathode of said first diode and a grid normally biased to prevent anode conduction; means for applying a positive-going gate pulse of predetermined duration to the grid of said third tube of sufficient magnitude to produce anode conduction; means for inverting and differentiating said gate pulse to produce a sharp positive-going trigger pulse at the trailing edge of said gate pulse; and means for applying said trigger pulse to the control element of the amplifier tube in said multivibrator circuit that is nonconductive in said stable state to trigger said multivibrator circuit to its unstable state.

3. Apparatus as claimed in claim 2 in which means are provided for adjusting the duration of the unstable state in said multivibrator circuit.

4. Apparatus as claimed in claim 3 in which means are provided for clamping the grid of said third tube at its normal bias potential.

References Cited in the file of this patent
UNITED STATES PATENTS 2,605,461    Koehler    July 29, 1951